US011775027B2

(12) United States Patent
Onda et al.

(10) Patent No.: US 11,775,027 B2
(45) Date of Patent: Oct. 3, 2023

(54) ELECTRONIC APPARATUS

(71) Applicant: Lenovo (Singapore) Pte. Ltd., Singapore (SG)

(72) Inventors: Yuichi Onda, Kanagawa (JP); Seita Horikoshi, Kanagawa (JP); Kenji Watamura, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/579,071

(22) Filed: Jan. 19, 2022

(65) Prior Publication Data
US 2022/0269316 A1 Aug. 25, 2022

(30) Foreign Application Priority Data
Feb. 24, 2021 (JP) ................ 2021-027262

(51) Int. Cl.
*G06F 1/16* (2006.01)
(52) U.S. Cl.
CPC ................ *G06F 1/1681* (2013.01)
(58) Field of Classification Search
None
See application file for complete search history.

(56) References Cited

U.S. PATENT DOCUMENTS

| | | | |
|---|---|---|---|
| 6,505,382 B1 | 1/2003 | Lam et al. | |
| 8,405,978 B2 * | 3/2013 | Okutsu | G06F 1/1643 361/679.55 |
| 10,168,746 B2 * | 1/2019 | Senatori | G06F 1/1616 |
| 10,416,727 B2 * | 9/2019 | Lin | G06F 1/1681 |
| 10,921,863 B2 * | 2/2021 | Gault | H04M 1/022 |
| 11,347,275 B2 * | 5/2022 | Hsu | G06F 1/1616 |
| 11,360,522 B2 * | 6/2022 | Ho | G06F 1/1681 |
| 2016/0041589 A1 | 2/2016 | Tazbaz | |
| 2016/0054761 A1 | 2/2016 | Wolff et al. | |
| 2019/0317561 A1 | 10/2019 | Cheng et al. | |

FOREIGN PATENT DOCUMENTS

| | | |
|---|---|---|
| JP | 2012-173878 A | 9/2012 |
| JP | 2013-062864 A | 4/2013 |
| JP | 2017-191370 A | 10/2017 |
| JP | 2019-008760 A | 1/2019 |

* cited by examiner

*Primary Examiner* — Anthony Q Edwards
*Assistant Examiner* — Rashen E Morrison
(74) *Attorney, Agent, or Firm* — Osha Bergman Watanabe & Burton LLP (57) ABSTRACT

An electronic apparatus includes: a first chassis having a keyboard mounted thereon; a second chassis having a display mounted thereon; a third chassis adjacent to end portions of the first chassis and the second chassis; a first hinge connecting the first chassis with the second chassis in a relatively rotatable manner; a torque mechanism section that is disposed in the first hinge and imparts predetermined rotational torque to a rotation between the first chassis and the second chassis; a second hinge connecting the third chassis to the first chassis in a relatively rotatable manner; and a lock section that locks the third chassis placed at an attitude protruding from the end portions of the first chassis and the second chassis with respect to the second chassis at the 0-degree attitude such that the lock section restricts a rotation of the third chassis by the second hinge.

4 Claims, 9 Drawing Sheets

FIG. 6

ELECTRONIC APPARATUS

CROSS-REFERENCE TO RELATED APPLICATIONS

This application claims priority to Japanese Patent Application No. 2021-027262 filed Feb. 24, 2021, the contents of which are incorporated herein by reference in their entirety.

TECHNICAL FIELD

The present invention relates to an electronic apparatus in which a plurality of chassis are connected.

BACKGROUND

Japanese Unexamined Patent Application Publication No. 2012-173878 and Japanese Unexamined Patent Application Publication No. 2013-062864 disclose configurations that include a third chassis with a battery device installed therein in addition to a first chassis with a keyboard device installed thereon and a second chassis with a display installed thereon.

In the configuration according to Japanese Unexamined Patent Application Publication No. 2012-173878, both the first chassis and the second chassis are connected to the third chassis in a relatively rotatable manner. In other words, the third chassis substantially functions as a hinge block between the first chassis and the second chassis.

Consequently, according to the configuration, when the second chassis having the display mounted thereon is opened, the bezel at the bottom edge of the front surface is markedly exposed, thus degrading the appearance quality. Further, in this configuration, each of two hinges is provided with a torque mechanism section, so that the structures of the hinges and their surrounding parts are complicated and large, resulting in further degradation in appearance quality. On the other hand, in this configuration, if, for example, the torque mechanism sections are removed from the hinges, then it will be difficult to stably maintain rotations and angles between the first chassis and the second chassis.

SUMMARY

One or more embodiments provide an electronic apparatus that can stably maintain rotations and angles between chassis while improving appearance quality at the same time.

An electronic apparatus according to one aspect includes: a first chassis having a keyboard mounted thereon; a second chassis having a display mounted thereon; a third chassis adjacent to end portions of the first chassis and the second chassis; a first hinge connecting the first chassis and the second chassis in a relatively rotatable manner between a 0-degree attitude at which the first chassis and the second chassis are placed to overlap each other in a surface normal direction and a predetermined angle attitude exceeding a 90-degree attitude at which surface normal directions thereof are orthogonal to each other; a torque mechanism section that is provided in the first hinge and imparts predetermined rotational torque to a rotation between the first chassis and the second chassis; a second hinge connecting the third chassis to the first chassis in a relatively rotatable manner; and a lock section which locks the third chassis placed at an attitude protruding from end portions of the first chassis and the second chassis with respect to the second chassis at the 0-degree attitude, thereby restricting a rotation of the third chassis by the second hinge.

One or more embodiments of the present invention can stably maintain rotations and angles between chassis while improving appearance quality at the same time.

DETAILED DESCRIPTION

The following will describe in detail an electronic apparatus according to embodiments of the present invention with reference to the accompanying drawings.

Figure 1:
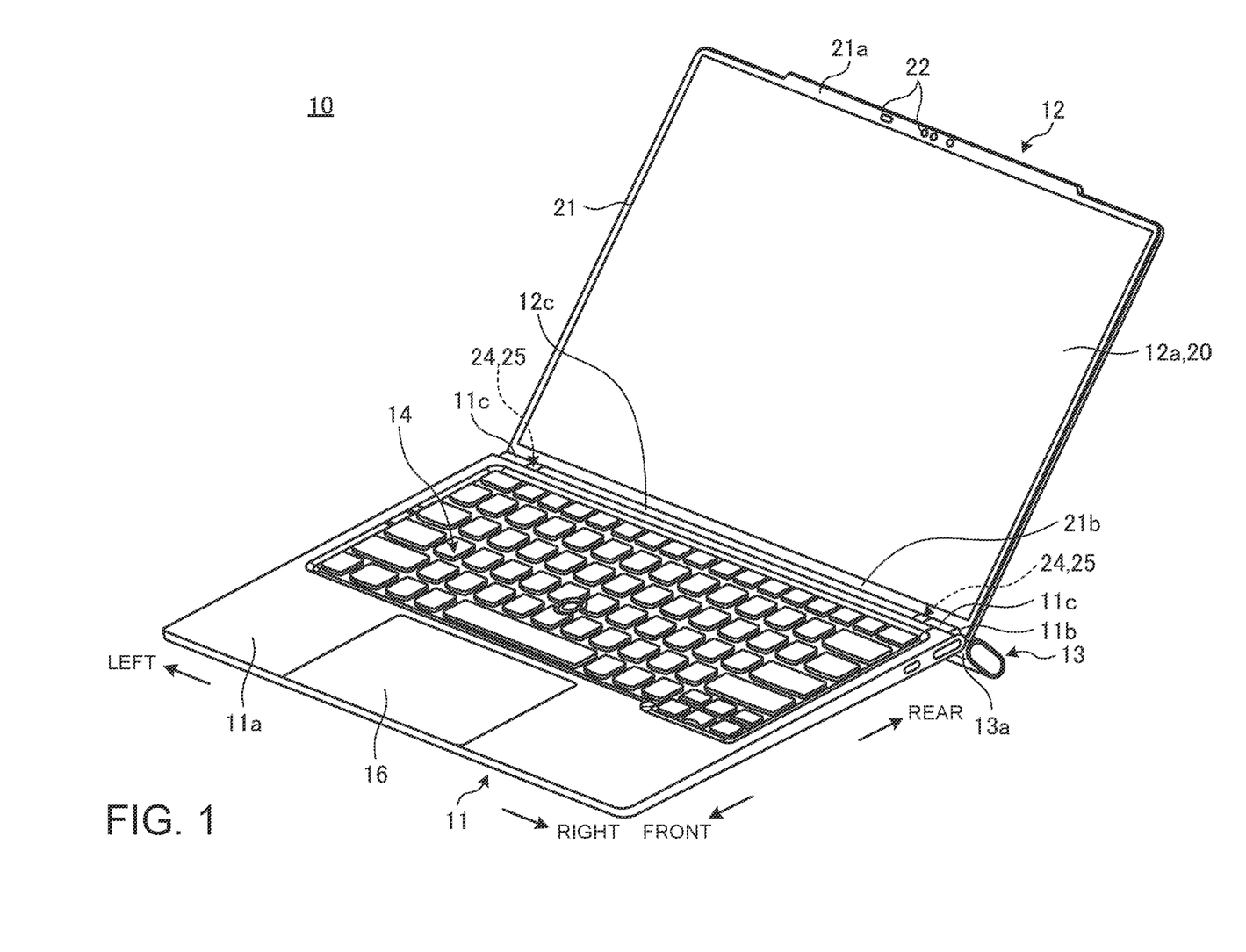
FIG. 1 is a perspective view of an electronic apparatus according to an embodiment.

FIG. 1 is a perspective view of an electronic apparatus 10 according to an embodiment. As illustrated in FIG. 1, the electronic apparatus 10 includes a first chassis 11, a second chassis 12, and a third chassis 13. The second chassis 12 and the third chassis 13 are connected to the first chassis 11 in a relatively rotatable manner. In the electronic apparatus 10, the first chassis 11 and the second chassis 12 constitute the exterior of a typical clamshell laptop PC, and the third chassis 13 functions as a device housing and a stand of the laptop PC.

Figure 2:
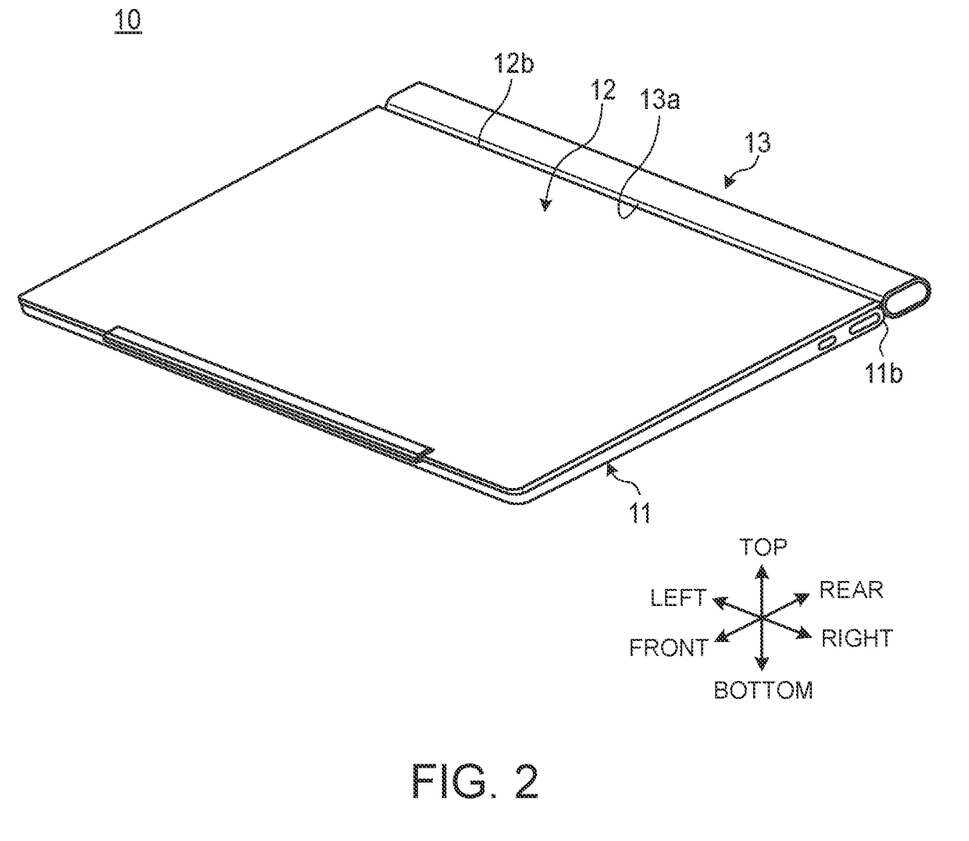
FIG. 2 is a perspective view of a state in which a first chassis and a second chassis have been closed to set a 0-degree attitude.

FIG. 2 is a perspective view illustrating a state in which the first chassis 11 and the second chassis 12 have been closed to set a 0-degree attitude. In the following description of the electronic apparatus 10, unless otherwise explained, the depth direction of each of the chassis 11 to 13 will be referred to as a front-rear direction, the width direction as a left-right direction, and the thickness direction as a top-bottom direction at the 0-degree attitude illustrated in FIG. 2. These directions are for convenience of description, and the actual directions vary depending on the attitude of the electronic apparatus 10 while being used or housed, or depending on a viewing direction.

First, the overall configuration of each of the chassis 11 to 13 will be described.

Figure 3A:
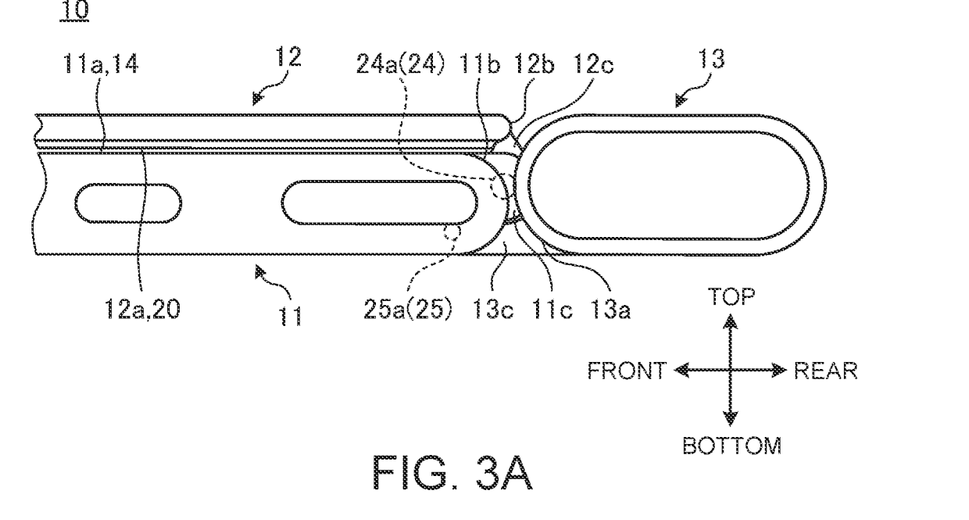
FIG. 3A is an enlarged schematic side view of a connection section and its surrounding parts of each chassis at the 0-degree attitude.
Figure 3B:
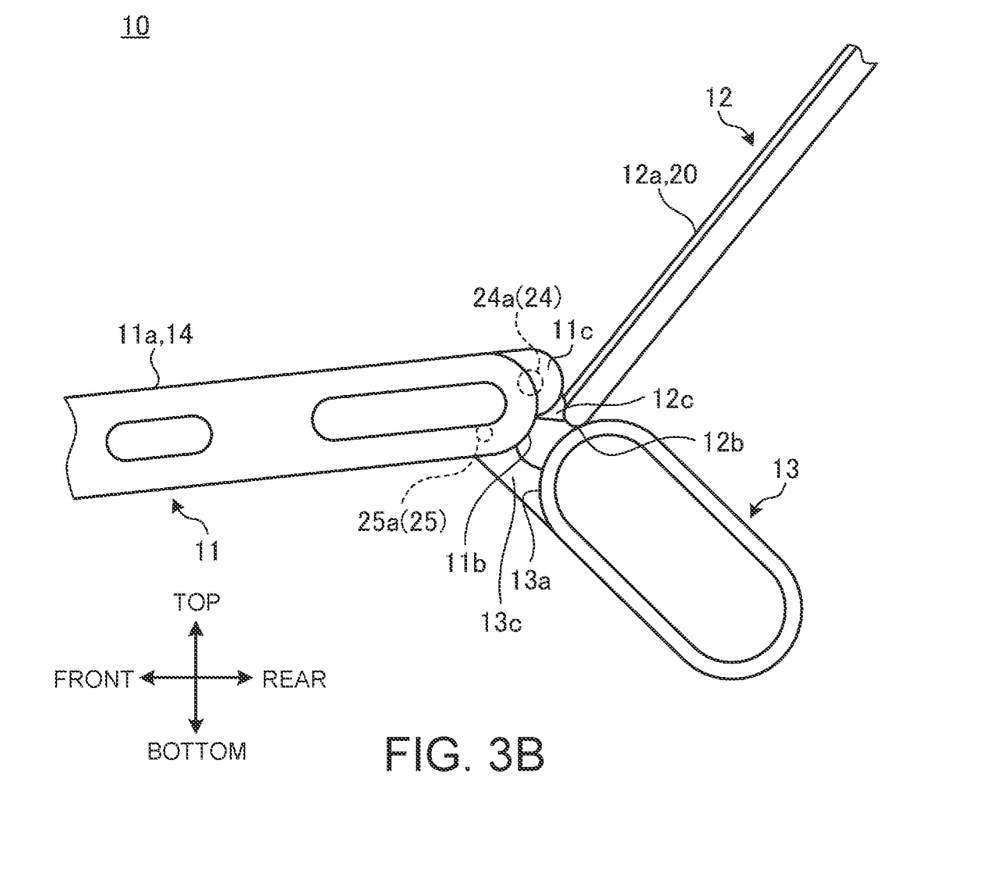
FIG. 3B is an enlarged schematic side view of the connection section and its surrounding parts of each chassis at a 135-degree attitude.
Figure 3C:
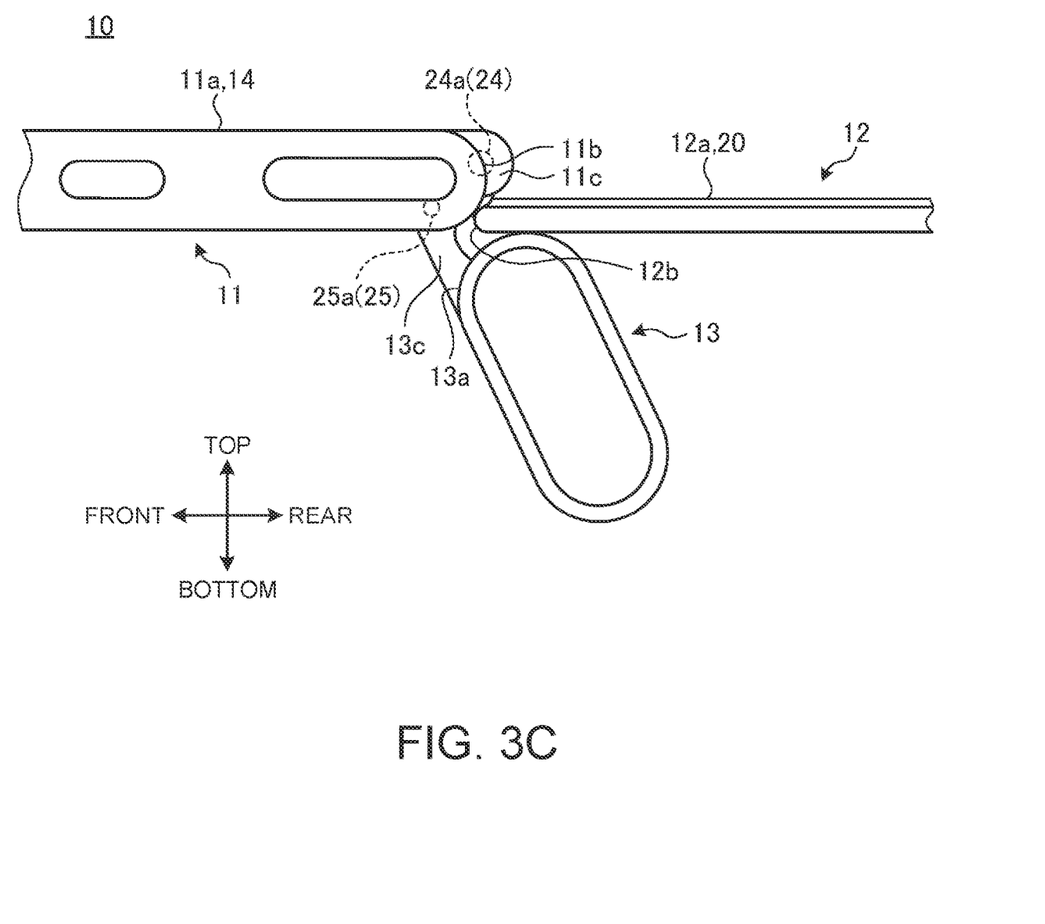
FIG. 3C is an enlarged schematic side view of the connection section and its surrounding parts of each chassis at the 180-degree attitude.

FIG. 3A, FIG. 3B, and FIG. 3C are enlarged schematic side views of the connection section and its surrounding parts of each of the chassis 11 to 13 at a 0-degree attitude, a 135-degree attitude, and a 180-degree attitude, respectively.

The first chassis 11 and the second chassis 12 can be rotated relative to each other from the 0-degree attitude, at which these two chassis are placed to overlap each other in a surface normal direction (refer to FIG. 2 and FIG. 3A), to a 180-degree attitude, at which the two chassis are placed side by side in a direction perpendicular to the surface normal directions thereof into a flat plate shape (refer to FIG. 3C) via a 90-degree attitude, at which the surface normal directions of the two chassis are orthogonal to each other. The third chassis 13 is relatively rotated with respect to the first chassis 11 by being pushed or pulled by the second chassis 12, which is rotated with respect to the first chassis 11. FIG. 1 and FIG. 3B illustrate a state in which the attitude angle between the first chassis 11 and the second chassis 12 has been set to 135 degrees. In this case, the angle between the second chassis 12 and the third chassis 13 is, for example 105 degrees, and the angle between the first chassis 11 and the third chassis 13 is, for example, 120 degrees.

The first chassis 11 is a thin box-shaped chassis. The first chassis 11 includes therein a motherboard 17 with a CPU and memories mounted thereon (refer to FIG. 4A), a battery device, and the like. A keyboard device 14 and a touch pad 16 are exposed on a surface 11a (the top surface when at the 0-degree attitude) of the first chassis 11. The first chassis 11 may have a touch-panel display on the surface 11a, and a software-based keyboard device may be displayed on the touch-panel display.

The second chassis 12 is a chassis shaped like a box that is thinner than the first chassis 11. A display 20 is exposed on a surface 12a (the bottom surface when at the 0-degree attitude) of the second chassis 12. The display 20 is, for example, a liquid crystal display or an organic EL display. The periphery of the display 20 is surrounded by a frame-shaped bezel 21. Of the four sides of the bezel 21, a part positioned on the upper side (a top bezel 21a) at the angle attitude illustrated in FIG. 1 is provided with subdevices 22, such as a camera, a microphone, and the like. A cover glass that covers the surface 12a of the second chassis 12 may serve as the bezel 21.

The third chassis 13 is a chassis shaped like a box that is thicker than the chassis 11 and 12, and has a smaller dimension in the front-rear direction. The plate thickness of the third chassis 13 is, for example, substantially the same as the total value of the plate thicknesses of the chassis 11 and 12 (refer to FIG. 3A). At the 0-degree attitude, the third chassis 13 takes an attitude protruding to the rear from rear end portions 11b and 12b of the chassis 11 and 12, respectively. The third chassis 13 has two major functions. The first function is a function as a device housing that houses the control board 20a (refer to FIG. 4A) of the display 20, a speaker 23, an antenna, and the like. The second function is a function as a stand when using the electronic apparatus 10 by opening the second chassis 12 from the first chassis 11.

A description will now be given of the specific configuration of the connection section of each of the chassis 11 to 13.

Figure 4A:
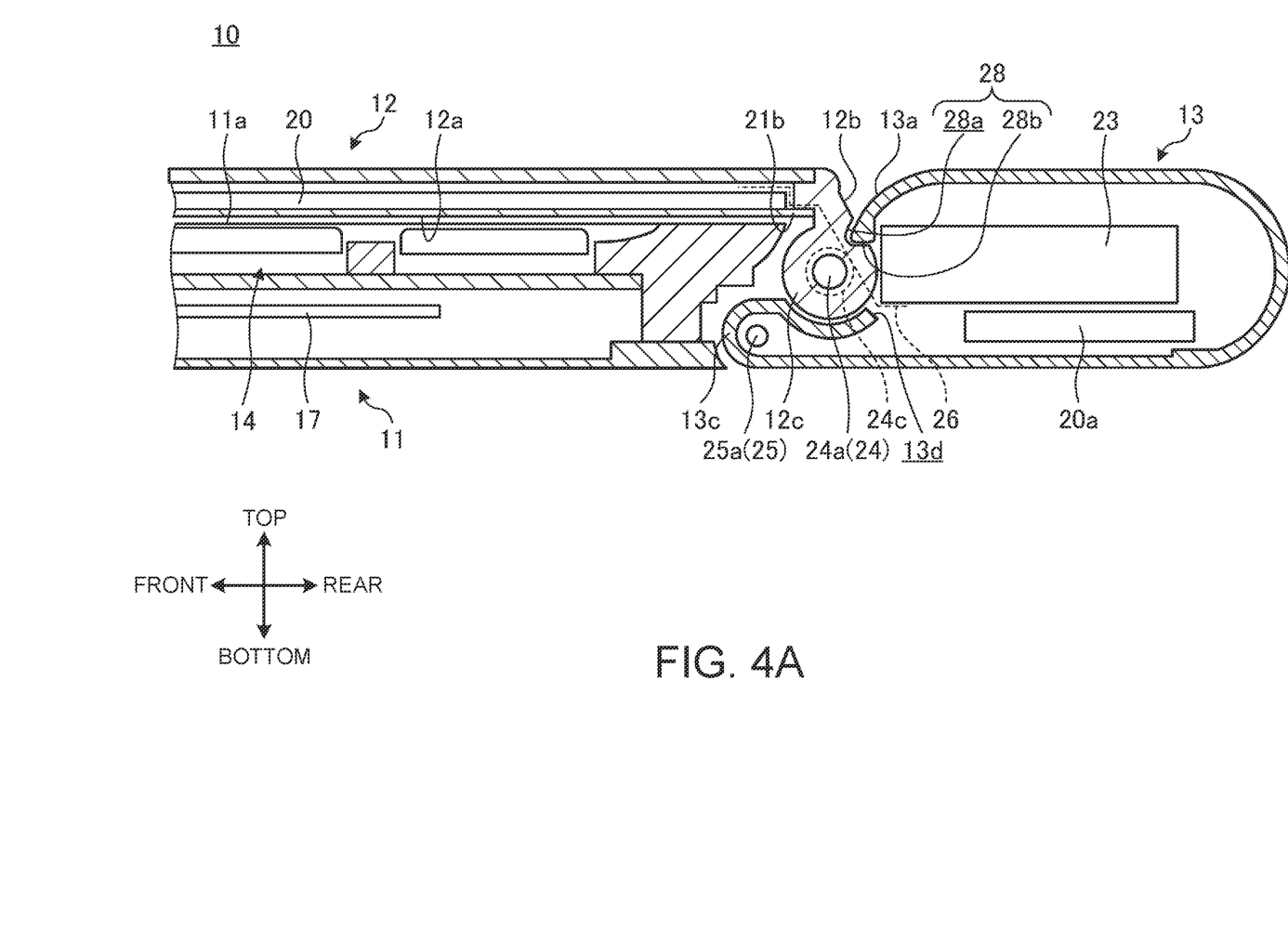
FIG. 4A is an enlarged schematic side sectional view of the connection section and its surrounding parts of each chassis at the 0-degree attitude.
Figure 4B:
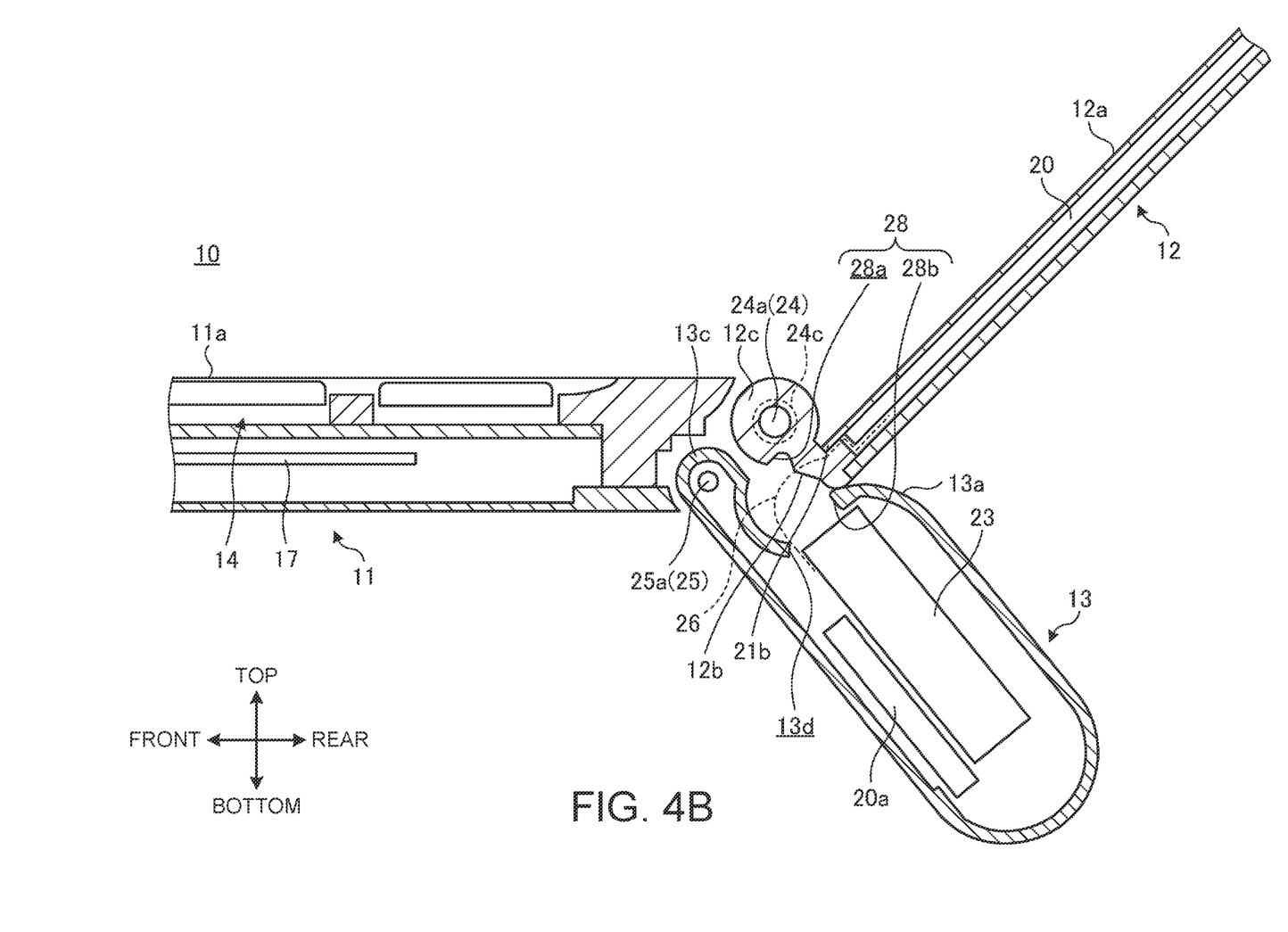
FIG. 4B is an enlarged schematic side sectional view of the connection section and its surrounding parts of each chassis at the 135-degree attitude.
Figure 4C:
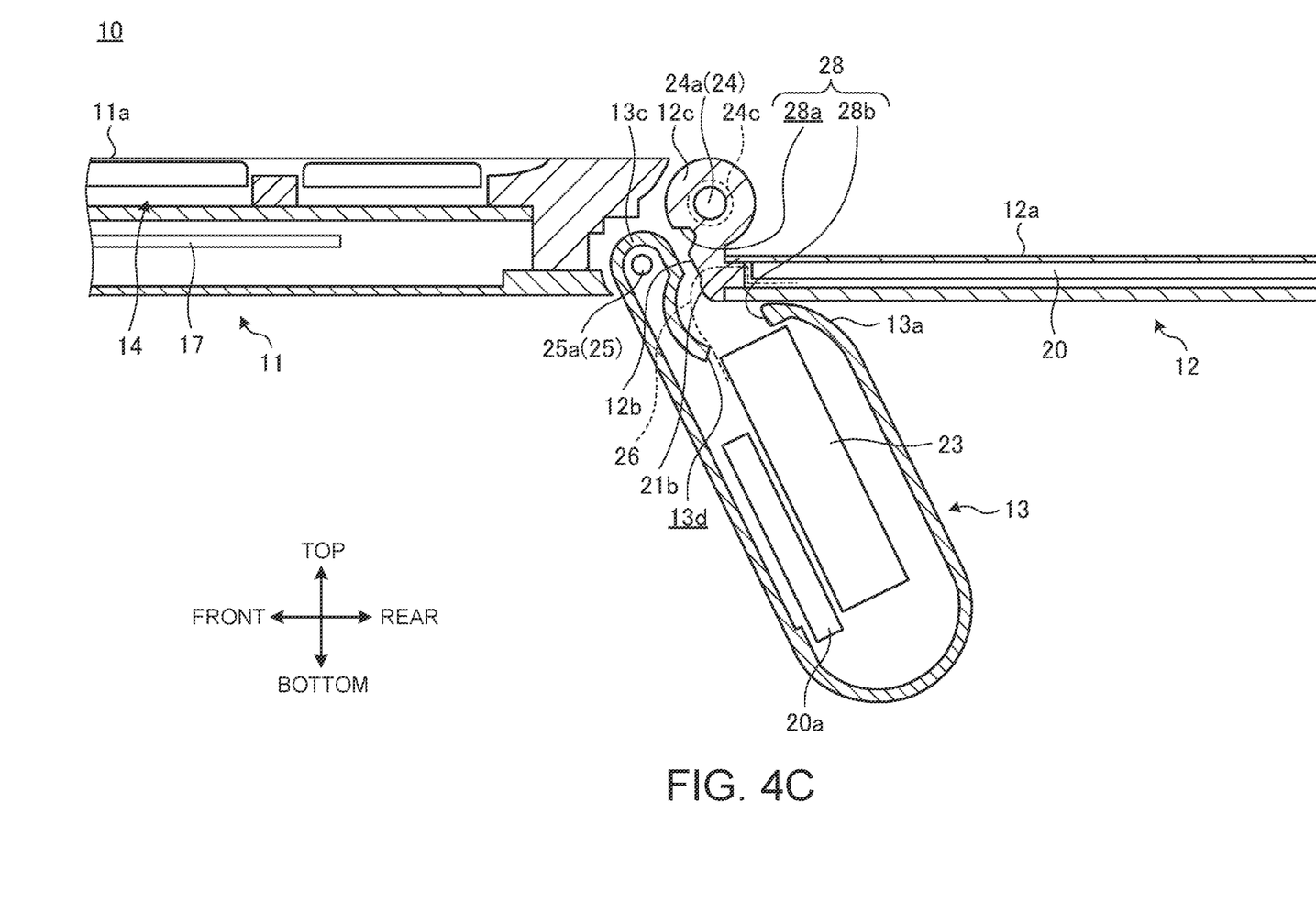
FIG. 4C is an enlarged schematic side sectional view of the connection section and its surrounding parts of each chassis at the 180-degree attitude.
Figure 5:
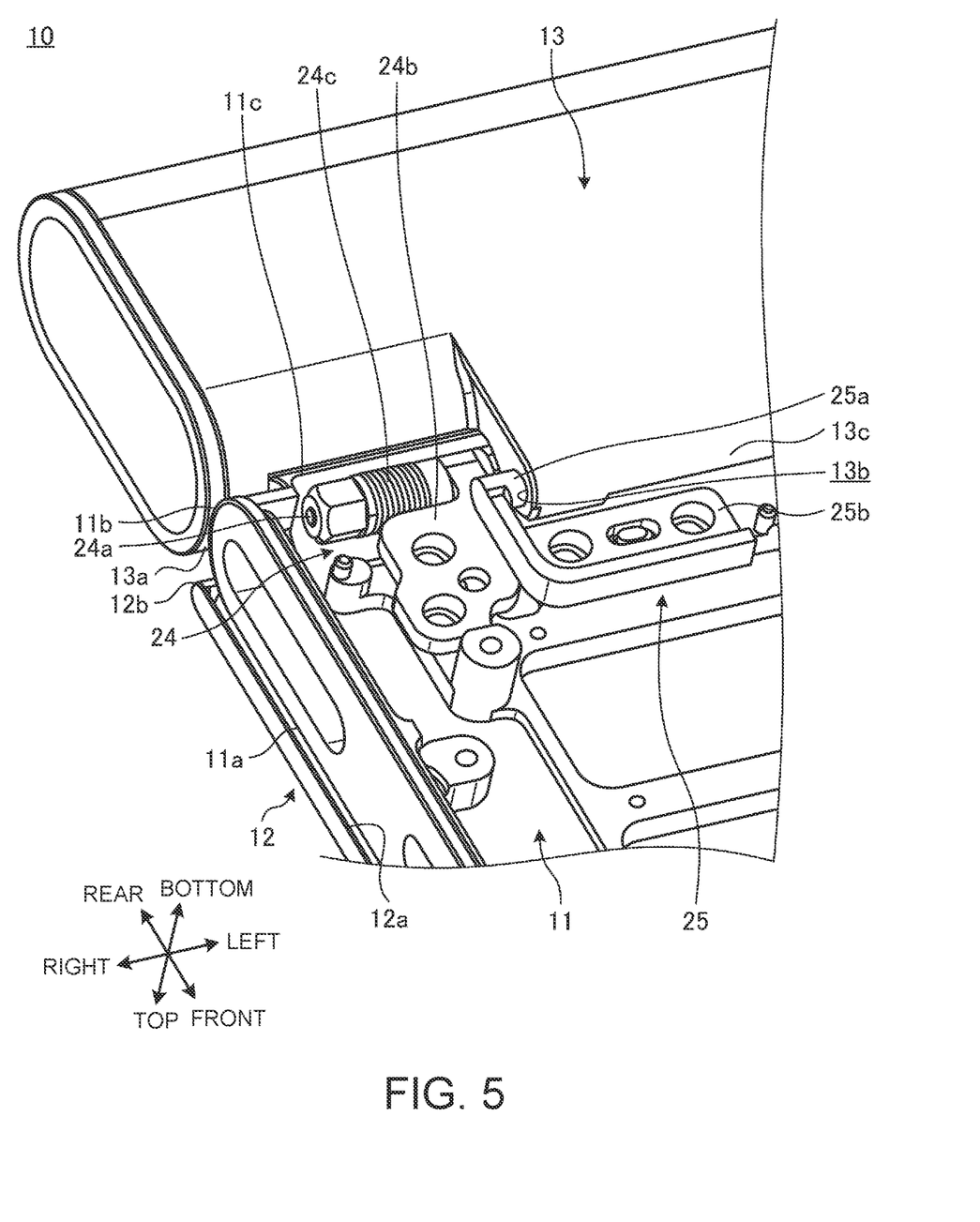
FIG. 5 is a perspective view of the connection section and its surrounding parts of each chassis at the 0-degree attitude observed from below.
Figure 6:
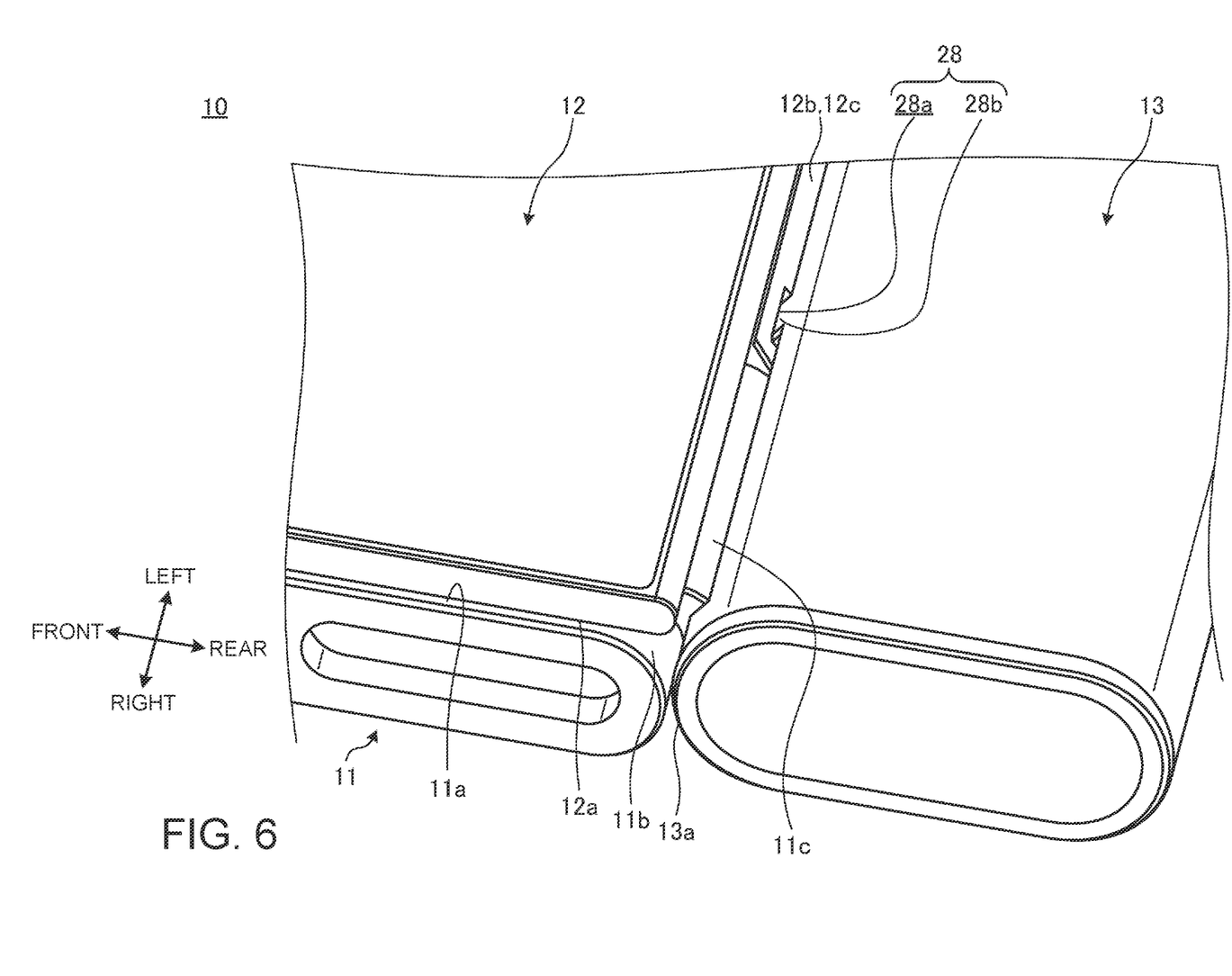
FIG. 6 is a perspective view of the connection section and its surrounding parts of each chassis at the 0-degree attitude observed from above.

FIG. 4A, FIG. 4B, and FIG. 4C are enlarged schematic side sectional views of the connection section and its surrounding parts of each of the chassis 11 to 13 at the 0-degree attitude, the 135-degree attitude, and the 180-degree attitude, respectively. FIG. 5 is a perspective view that illustrates the connection section and its surrounding parts of each of the chassis 11 to 13 at the 0-degree attitude observed from front obliquely below, and schematically illustrates the internal structure of the first chassis 11, with a cover member, which constitutes the bottom surface of the first chassis 11, removed. FIG. 6 is a perspective view of the connection section and its surrounding parts of each of the chassis 11 to 13 at the 0-degree attitude observed from above.

As illustrated in FIG. 4A to FIG. 5, the first chassis 11 and the second chassis 12 have the rear end portions 11b and 12b thereof connected in a relatively rotatable manner by using first hinges 24. The first chassis 11 and the third chassis 13 have the rear end portion 11b and a front end portion 13a thereof connected in a relatively rotatable manner by using second hinges 25. Although the second chassis 12 and the third chassis 13 are not directly connected by hinges, wiring, traction members 26, and the like extend therebetween.

As illustrated in FIG. 4A to FIG. 5, the first hinge 24 has a first hinge shaft 24a, a first bracket 24b, and a torque mechanism section 24c. The first hinge 24 of the present embodiment is installed as a pair on the left and right, and has a structure that is laterally symmetrical to each other.

The first hinge shaft 24a is a metal shaft serving as the shaft of rotation between the chassis 11 and 12. The first bracket 24b is a metal plate for attaching the first hinge 24 to the first chassis 11, and is fixed to the first chassis 11. The torque mechanism section 24c is a mechanism that imparts predetermined rotational torque to the rotation between the chassis 11 and 12 by the first hinge 24.

The first hinge shaft 24a has one end portion thereof unrotatably fitted to a bearing of the second chassis 12 and the other end portion thereof inserted in a bearing of the first bracket 24b in a relatively rotatable manner. Further, the other end portion of the first hinge shaft 24a is inserted in the torque mechanism section 24c. The torque mechanism section 24c is composed of, for example, a plurality of metal discs, through which the first hinge shaft 24a passes, stacked in the axial direction of the first hinge shaft 24a, and is configured to impart predetermined rotational torque between the first hinge shaft 24a and the first bracket 24b by the sliding friction between the discs. Thus, the torque mechanism section 24c imparts the predetermined rotational torque to the relative rotation between the first hinge shaft 24a and the first bracket 24b, that is, the predetermined rotational torque is imparted by the torque mechanism section 24c to the relative rotation between the chassis 11 and 12.

As illustrated in FIG. 3A to FIG. 3C and FIG. 5, semi-cylindrical protrusions 11c are provided at both left and right ends of the rear end portion 11b of the first chassis 11 (refer also to FIG. 1). Each of the protrusions 11c is a portion protruding rearward relative to the central portion of the rear end portion 11b. A jaw-shaped hinge block 12c provided at the rear end portion 12b of the second chassis 12 is inserted into the gap between the left and right protrusions 11c and 11c in a relatively movable manner (refer also to FIG. 6). The hinge block 12c projects from a surface 12a of the second chassis 12 in a substantially L shape so as to be orthogonal thereto.

In each of the first hinges 24, the first hinge shaft 24a and the torque mechanism section 24c are installed to each of the protrusions 11c. The first hinge shaft 24a passes through the inward-facing side end surfaces of the protrusions 11c, and is inserted into the hinge block 12c and fixed. Thus, the first hinges 24 connect the first chassis 11 and the second chassis 12.

As illustrated in FIG. 4A to FIG. 5, the second hinge 25 has a second hinge shaft 25a and a second bracket 25b. The second hinge 25 is installed in a pair on the left and right to be laterally symmetrical to each other.

The second hinge shaft 25a is a metal shaft serving as the shaft of rotation between the chassis 11 and 13. The second bracket 25b is a metal plate for attaching the second hinge 25 to the first chassis 11, and is fixed to the first chassis 11.

In the second hinge 25, the second hinge shaft 25a and the second bracket 25b are integrally formed. One end of the second hinge shaft 25a is inserted into a bearing 13b of the third chassis 13 in a relatively rotatable manner (refer to FIG. 5). The other end of the second hinge shaft 25a is integral with the second bracket 25b.

Unlike the first hinge 24, the second hinge 25 does not have an intentional torque mechanism section for generating rotational torque for the rotation between the chassis 11 and 13, that is, a mechanical or structural mechanism for generating torque. Consequently, relative rotation is performed between the second hinge shaft 25a and the bearing 13b of the third chassis 13 with substantially no rotational torque. As a result, as is clear from FIG. 5, the second hinge 25 is simpler and smaller in structure than the first hinge 24 having the torque mechanism section 24c.

However, when the second chassis 12 is opened, if the traction member 26 is flexed as described below (refer to FIG. 4B and FIG. 4C), the third chassis 13 may develop backlash corresponding to the amount of the flexion. Therefore, when the electronic apparatus 10 is lifted with the second chassis 12 open to a certain extent or more, the third chassis 13 inconveniently moves by the amount of the backlash. In this regard, in an actual product, rotational torque due to the sliding friction between members may naturally occur between the second hinge shaft 25a and the bearing 13b. The rotational torque due to the sliding friction is extremely small, as compared with the torque generated by the torque mechanism section 24c of the first hinge 24. However, effects such as the rotational torque due to the sliding friction and the resistance due to the wiring laid between the third chassis 13 and the chassis 11, 12 suppress the occurrence of an excessive free backlash of the third chassis 13 that impairs the product quality. Further, a lubricant such as damper grease may be applied to the outer peripheral surface of the second hinge shaft 25a to impart a minute rotational torque to the rotation of the second hinge shaft 25a. This makes it possible to further suppress the backlash of the third chassis 13. As a matter of course, the grease does not adversely affect the simplification and downsizing of the structure of the second hinge 25.

As illustrated in FIG. 3A to FIG. 5, a front end portion 13a of the third chassis 13 is provided with an arm portion 13c shaped substantially like a boomerang protruding forward in a side view. The arm portion 13c is provided at a position where the arm portion 13c vertically overlaps the hinge block 12c of the second chassis 12, and protrudes forward from both the left and right end portions of the front end portion 13a. The arm portion 13c is inserted into the gap between the left and right protrusions 11c and 11c of the first chassis 11 in a relatively movable manner (refer to FIG. 5).

In each of the second hinges 25, the second hinge shaft 25a is installed in the vicinity of the protrusion 11c. The second hinge shaft 25a passes the inward-facing side end surface of the protrusion 11c, and is inserted into the arm portion 13c and supported by the bearing 13b. Thus, the second hinges 25 connect the first chassis 11 and the third chassis 13 in a relatively rotatable manner.

As described above, the arm portion 13c of the third chassis 13 vertically overlaps the hinge block 12c of the second chassis 12. Here, as illustrated in FIG. 4A, the axial center of the second hinge shaft 25a is placed at a position where the axial center is on the front side in a front-rear direction of the first chassis 11 and on the bottom side in the top-bottom direction of the first chassis 11 with respect to the axial center of the first hinge shaft 24a.

As described above, the second hinges 25 do not have torque mechanism sections. Therefore, the third chassis 13 rotates without rotational torque with respect to the first chassis 11, and moves relative to the second chassis 12 in such a manner as to turn without rotational torque. Consequently, the electronic apparatus 10 has the traction members 26 and a lock section 28 between the second chassis 12 and the third chassis 13.

As illustrated in FIG. 4A to FIG. 4C, the traction members 26 are sheet-like or wire-like members extending between the second chassis 12 and the third chassis 13. The traction members 26 in the present embodiment are thin, flexible sheet-like members formed of a metal such as stainless steel. The traction members 26 are members that have substantially no stretchability. The traction members 26 may be members having stretchability. In this case, however, the traction members 26 preferably stretch fully at an angle (e.g., 40-degree attitude) when the second chassis 12 is rotated with respect to the first chassis 11 in the direction toward the 0-degree attitude from the 135-degree attitude. This enables the third chassis 13 to be smoothly pulled by the second chassis 12 even with the traction members 26 having stretchability. Further, the traction members 26 having stretchability fully stretch at an angle greater than zero degrees (e.g., the 40-degree attitude mentioned above), so that the reaction force generated when the traction members 26 contract will act between the chassis 12 and 13 during the rotation toward the zero degrees via 40 degrees. Hence, after 40 degrees, the rotation of the third chassis 13 to zero degrees will be even smoother. In addition, the traction members 26 provide an effect of pulling the third chassis 13 toward the second chassis 12 at the 0-degree attitude, thus stabilizing the attitude of the third chassis 13.

One end portion of each of the traction members 26 is inserted into the second chassis 12 through a rearward-facing opening formed in a rear end portion 12b (the hinge block 12c) of the second chassis 12, and is fixed to, for example, a rear cover member of the second chassis 12. The other end portion of the traction member 26 is inserted into the third chassis 13 through a forward-facing opening 13d formed in a front end portion 13a of the third chassis 13, and is fixed to, for example, the speaker 23. The wiring to the control board 20a from the display 20 and the traction members 26 pass through the opening 13d and extend between the chassis 12 and 13. Further, the wiring from the control board 20a or the speaker 23 to the motherboard 17 also passes through the opening 13d and extends between the chassis 11 and 13.

At the 0-degree attitude illustrated in FIG. 4A, the traction members 26 are in a slightly loosened state. At an angle attitude (e.g., the 40-degree attitude) between the 0-degree attitude and the 90-degree attitude, the traction members 26 become taut and tensioned with no flexure between the chassis 12 and 13. At the 135-degree attitude illustrated in FIG. 4B, the traction members 26 become loosened with flexure between the chassis 12 and 13. At the 180-degree attitude illustrated in FIG. 4C, the traction members 26 are flexed between the chassis 12 and 13 to approximately the same extent as at the 135-degree attitude, or are flexed to some extent although the traction members 26 are pulled somewhat more than at the 135-degree attitude. Consequently, when the chassis 11 and 12 are closed from the 180-degree attitude to the 0-degree attitude, the traction members 26 can pull the third chassis 13 toward the second chassis 12.

As illustrated in FIG. 4A to FIG. 4C and FIG. 6, the lock section 28 is composed of a recessed portion 28a serving as a first lock portion and a protruding portion 28b that is formed to be engageable with and disengageable from the recessed portion 28a, and serves as a second lock portion. The recessed portion 28a is a portion of the rear end portion 12b of the second chassis 12, the portion being located at the hinge block 12c and being recessed forward. The protruding portion 28b is formed at the front end portion 13a of the third chassis 13, and is provided at, for example, an upper edge portion of the opening 13d. The lock section 28 may have the recessed portion 28a provided in the third chassis 13 and the protruding portion 28b in the second chassis 12.

At the 0-degree attitude illustrated in FIG. 4A, the lock section 28 is in a state in which the protruding portion 28b engages with the recessed portion 28a, thus locking the relative movement of the third chassis 13 with respect to the chassis 11 and 12. Specifically, with the lock section 28 in the engaged state, the third chassis 13 is locked to the second chassis 12, thereby restricting the rotation of the third chassis 13 with respect to the first chassis 11 by the second hinge 25. At the 135-degree attitude and the 180-degree attitude illustrated in FIG. 4B and FIG. 4C, respectively, the lock section 28 is in a disengaged state in which the protruding portion 28b is separated from the recessed portion 28a, thus allowing the third chassis 13 to relatively move with respect to the chassis 11 and 12. In other words, in the electronic apparatus 10, the second hinge 25 does not have a torque mechanism section. Therefore, in the electronic apparatus 10, the third chassis 13 is locked to the second chassis 12 through the lock section 28 at the 0-degree attitude, thereby restricting the third chassis 13 from developing backlash or unexpectedly rotating.

A description will now be given of the operation and working effects of the electronic apparatus 10.

First, the state in which the chassis 11 and 12 are at the 0-degree attitude as illustrated in FIG. 4A will be described. In this state, the surfaces 11a and 12a of the chassis 11 and 12, respectively, face each other, that is, the keyboard device 14 and the display 20 face each other. The third chassis 13 is at an attitude of protruding rearward from the rear end portions 11b and 12b of the chassis 11 and 12, respectively. As illustrated in FIG. 3A and FIG. 4A, the thickness of the third chassis 13 is set to be the same as or substantially the same as the total value obtained by adding the thickness of the first chassis 11 and the thickness of the second chassis 12.

Therefore, at the 0-degree attitude, the electronic apparatus 10 is as thin as a typical laptop PC, and transformed into a substantially single plate (refer also to FIG. 2). The third chassis 13 can easily accommodate a speaker 23, particularly a large-volume component such as a woofer, together with the control board 20a by utilizing a thickness larger than those of the other chassis 11 and 12. As a result, the first chassis 11 does not need to accommodate the speaker 23 and the like, or at least does not need a space for installing a thick component such as a woofer, and can be made thinner accordingly. Of the speaker components, a woofer in particular is difficult to make thinner and can be a limitation in determining the thickness of the first chassis 11, so that the fact that the woofer can be installed in the third chassis 13 makes it easier to reduce the thickness of the first chassis 11. Further, the second chassis 12 does not need the control board 20a, which was conventionally placed on the rear side of the display 20, and can be therefore made thinner accordingly.

The 0-degree attitude is the attitude used when carrying the electronic apparatus 10. As described above, in the electronic apparatus 10 of the present embodiment, the second hinge 25 connecting the third chassis 13 to the first chassis 11 does not have a torque mechanism section. Therefore, if a user grasps, for example, the third chassis 13 at the rear end with his/her hand when carrying the electronic apparatus 10, then there is a concern that the chassis 11 and 12 on the front side will be folded downward from the second hinge shaft 25a due to their own weights. Further, if the user grasps, for example, the front ends of the chassis 11 and 12 with his/her hand, then there is a concern that the third chassis 13 on the rear side will be folded downward from the second hinge shaft 25a due to its own weight.

Therefore, the electronic apparatus 10 includes the lock section 28 to lock the third chassis 13 with respect to the chassis 11 and 12 at the 0-degree attitude. This enables the electronic apparatus 10 to avoid the problem of the chassis 11, 12 or 13 being folded downward when carrying the electronic apparatus 10, as described above, and the angles of the chassis 11 to 13 are stably maintained.

A description will now be given of the operation of opening the chassis 11 and 12 from the 0-degree attitude toward the 180-degree attitude. In this opening operation, as in the case of a typical clamshell laptop PC, the front of the second chassis 12 is raised from the first chassis 11 in a state in which, for example, the electronic apparatus 10 is placed on a desk or the like. Then, as illustrated in FIG. 4A and FIG. 4B, the second chassis 12 rotates with respect to the first chassis 11, with the first hinge shaft 24a serving as the rotation shaft. This rotational movement is performed under the torque imparted by the torque mechanism section 24c, thus making it possible to maintain the second chassis 12 at a desired angle attitude with respect to the first chassis 11. Although the second hinge 25 has a torque-free structure, the second hinge 25 is not involved in maintaining an angle between the first chassis 11 and the second chassis 12.

Here, the hinge block 12c protrudes from the rear end portion 12b of the second chassis 12, and the first hinge shaft 24a is located at the tip end of the hinge block 12c. In other words, the first hinge 24 is a so-called drop-down hinge. Consequently, as illustrated in FIG. 4B, the second chassis 12 moves to a position where the rear end portion 12b is hidden behind the first chassis 11 at the 135-degree attitude and at angles in the vicinity thereof where the same usage mode as that of a typical clamshell laptop PC is expected. More specifically, in the second chassis 12, the bezel 21 (a lower bezel 21b) on the rear side of the display 20 (the lower side in FIG. 4B) moves to a level lower than the surface 11a of the first chassis 11. As a result, when the electronic apparatus 10 is in use, the lower bezel 21b is hidden by the first chassis 11 and is not noticeable, thus providing high appearance quality.

At this time, the axial center of the second hinge shaft 25a is located at a position on the front side and lower with respect to the axial center of the first hinge shaft 24a. Consequently, as illustrated in FIG. 4A and FIG. 4B, when the hinge block 12c rotates during the opening operation, first, the recessed portion 28a causes the third chassis 13 to rotate clockwise in the drawing, with the second hinge shaft 25a serving as the rotation shaft, while pushing the protruding portion 28b down. Then, the rear end portion 12b of the second chassis 12, which rotates, slides while pressing the front end portion 13a of the third chassis 13, the front end portion 13a being formed to have a curved surface. In the case of the present embodiment, the second hinge shaft 25a is torque-free. Therefore, as illustrated in FIG. 4B, the third chassis 13 easily rotates by receiving the pressing force from the rear end portion 12b of the second chassis 12, and moves, hanging down from the bottom surface of the first chassis 11. In the lock section 28, when, for example, the second chassis 12 is opened to approximately 40 to 45 degrees with respect to the first chassis 11, the protruding portion 28b starts to disengage from the recessed portion 28a, and the engaged state is released.

As illustrated in FIG. 3B and FIG. 4B, at the 135-degree attitude, the third chassis 13 is set at an angle attitude of approximately 120 degrees with respect to the first chassis 11 and approximately 105 degrees with respect to the second chassis 12. Consequently, the electronic apparatus 10 is set at an attitude where the rear end portion 11b of the first chassis 11 is raised somewhat upward by the third chassis 13 on a desk or the like (refer to FIG. 3B). As a result, the third chassis 13 functions as a stand for the electronic apparatus 10, and the first chassis 11 is set at an appropriate angle attitude, with the front thereof down, thus improving the ease of use of the keyboard device 14. At the same time, the function of the third chassis 13 as the stand raises the chassis 12 thereby to move up the position of the display 20, so that the user's point of view is raised, and strain on the user's neck or the like is expected to be reduced.

The opening operation from the 135-degree attitude to the 180-degree attitude is the same as the opening operation from the 0-degree attitude to the 135-degree attitude. More specifically, as illustrated in FIG. 4B and FIG. 4C, the rear end portion 12b of the second chassis 12, which rotates, slides while further pressing the front end portion 13a of the third chassis 13. As a result, at the 180-degree attitude illustrated in FIG. 4C, the surfaces 11a and 12a of the first chassis 11 and the second chassis 12, respectively, become substantially parallel, and the third chassis 13 rotates further clockwise from the 135-degree attitude and stops at this position. The third chassis 13 does not rotate further clockwise from the attitude illustrated in FIG. 4C because the traction members 26 are tensioned or there is a stopper between the third chassis 13 and the first chassis 11.

Next, in the closing operation to the 0-degree attitude from the 180-degree attitude, the front of the second chassis 12 is grasped, raised and rotated from the state illustrated in FIG. 4C. This causes the second chassis 12 to rotate in the opposite direction from that in the opening operation, and the rear end portion 12b moves away from the front end portion 13a of the third chassis 13. Consequently, each of the traction members 26 having one end portion fixed to the second chassis 12 is in a flexed and loose state at the 180-degree attitude or the 135-degree attitude, but loses the amount of the flexion toward the 0-degree attitude.

Then, when the attitude passes, for example, the 90-degree attitude, the traction members 26 are set to the tensioned state. Consequently, as the second chassis 12 closes, the third chassis 13 is pulled up by the traction members 26 toward the position of the 0-degree attitude. Here, in the lock section 28, the protruding portion 28b starts to engage with the recessed portion 28a when, for example, the second chassis 12 reaches approximately 45 to 40 degrees with respect to the first chassis 11 and the third chassis 13 reaches approximately 18 degrees with respect to the first chassis 11. As a result, at the 0-degree attitude, the third chassis 13 returns to the attitude parallel to the chassis 11 and 12 again, and the lock section 28 also returns to the engaged state. At this time, the second hinge 25 is torque-free, thus requiring only a minimum amount of a force for pulling up the third chassis 13 by the traction members 26. Further, in the state in which the electronic apparatus 10 is placed on a desk or the like, the third chassis 13 gradually rotates also toward the 0-degree attitude by the self-weight of the electronic apparatus 10 in the closing operation, so that the force for pulling up the third chassis 13 becomes even smaller.

The traction members 26 may be omitted. More specifically, in a configuration without the traction members 26, the third chassis 13 will not follow the closing movement of the second chassis 12. However, in a state in which the electronic apparatus 10 is placed on a desk or the like, the third chassis 13 also gradually rotates toward the 0-degree attitude due to the self-weight of the electronic apparatus 10. Further, in a state in which the electronic apparatus 10 is not placed on a desk or the like, if a user manually rotates the third chassis 13 to the 0-degree attitude, then the lock section 28 will be in an engaged state thereafter, so that there will be no problem in particular. However, if the traction members 26 are omitted, the stopper function of the traction members 26, which restrict the opening angles of the chassis 12 and 13, will be lost. Therefore, if the traction members 26 are omitted, the first chassis 11 should be provided with, for example, a stopper that restricts the rotation of the third chassis 13 so as to suppress an excessive rotation of the third chassis 13 in the opening direction, which causes the wiring (FPC or the like) extending between the chassis 12 and 13 to fully stretch and break. In other words, restricting the rotational angle of the third chassis 13 by the traction members 26 makes it possible to shorten the wiring that extends between the chassis 12 and 13 and to reduce the space for the extra length of the wiring in the chassis 12 and 13.

As described above, in the electronic apparatus 10 according to the present embodiment, the second chassis 12 is connected to the first chassis 11 provided with the keyboard device 14 by using the first hinge 24 having the torque mechanism section 24c, and the third chassis 13 is connected to the first chassis 11 by using the second hinge 25. Further, at the attitude of zero degrees between the chassis 11 and 12, the third chassis 13 takes an attitude protruding to the rear from the rear end portions 11b and 12b of the chassis 11 and 12, respectively. Consequently, in the electronic apparatus 10, when the second chassis 12 is opened, the third chassis 13 is automatically rotated by being pushed by the rear end portion 12b of the second chassis 12. As a result, the electronic apparatus 10 can be used like a typical clamshell laptop PC.

Here, the third chassis 13 is connected to the first chassis 11 by the second hinge 25 configured to be substantially torque-free. Therefore, the electronic apparatus 10 has the lock section 28, which locks the second chassis 12 and the third chassis 13 at the 0-degree attitude, thus making it possible to suppress an unexpected rotation of the third chassis 13 at the 0-degree attitude.

In the electronic apparatus 10, the second hinge shaft 25a is located in front and lower with respect to the first hinge shaft 24a. Consequently, although the two hinge shafts 24a and 25a are installed to the first chassis 11, the thickness of the first chassis 11 can be controlled to a minimum. In addition, the second hinge 25 has the simpler and smaller structure, as compared with the first hinge 24 having the torque mechanism section 24c. This makes it possible to further suppress the thickness of the first chassis 11. As described above, the electronic apparatus 10 achieves the complicated movement at the time of opening and closing due to the inclusion of the third chassis 13 by the combination of the same torque hinge (the first hinge 24) as that of a typical laptop PC and the torque-free hinge (the second hinge 25). As a result, the electronic apparatus 10 does not need to use a hinge of a complicated structure having a number of components, thus making the electronic apparatus 10 advantageous in reliability and cost.

The present invention is not limited to the embodiment described above, and can of course be freely modified without departing from the gist of the present invention.

In the above, the configuration in which the first chassis 11 and the second chassis 12 can be rotated between the 0-degree attitude and the 180-degree attitude has been exemplified. However, if the second chassis 12 can be rotated to a predetermined angle attitude beyond the 90-degree attitude, e.g., approximately 135-degree attitude, with respect to the first chassis 11, then the same usage form as that of a typical clamshell laptop PC can be ensured.

In the above, the lock section 28 provided with the recessed portion 28a and the protruding portion 28b has been exemplified. However, the lock section 28 may have a configuration such as one in which the third chassis 13 is locked by utilizing the attraction force of a magnet in addition to or in place of the configuration that includes the recessed portion 28a and the protruding portion 28b.

What is claimed is:

1. An electronic apparatus comprising:
a first chassis comprising a keyboard mounted thereon;
a second chassis comprising a display mounted thereon;
a third chassis adjacent to end portions of the first chassis and the second chassis;
a first hinge connecting the first chassis with the second chassis in a relatively rotatable manner between a 0-degree attitude at which the first chassis and the second chassis are placed to overlap each other in a surface normal direction and a predetermined angle attitude exceeding a 90-degree attitude at which surface normal directions thereof are orthogonal to each other;
a torque mechanism section that is disposed in the first hinge and imparts predetermined rotational torque to a rotation between the first chassis and the second chassis;
a second hinge connecting the third chassis to the first chassis in a relatively rotatable manner; and
a lock section that locks the third chassis placed at an attitude protruding from end portions of the first chassis and the second chassis with respect to the second chassis at the 0-degree attitude such that the lock section restricts a rotation of the third chassis by the second hinge, wherein
the lock section comprises:
a first lock portion disposed in the second chassis; and
a second lock portion disposed in the third chassis and is engageable with and disengageable from the first lock portion,
the first lock portion is one of a protruding portion and a recessed portion, and the second lock portion is the other of the protruding portion and the recessed portion, and
the first lock portion and the second lock portion are engaged with each other at the 0-degree attitude and are disengaged from each other at least at the predetermined angle attitude.

2. An electronic apparatus comprising:
a first chassis comprising a keyboard mounted thereon;
a second chassis comprising a display mounted thereon;
a third chassis adjacent to end portions of the first chassis and the second chassis;
a first hinge connecting the first chassis with the second chassis in a relatively rotatable manner between a 0-degree attitude at which the first chassis and the second chassis are placed to overlap each other in a surface normal direction and a predetermined angle attitude exceeding a 90-degree attitude at which surface normal directions thereof are orthogonal to each other;
a torque mechanism section that is disposed in the first hinge and imparts predetermined rotational torque to a rotation between the first chassis and the second chassis;
a second hinge connecting the third chassis to the first chassis in a relatively rotatable manner; and
a lock section that locks the third chassis placed at an attitude protruding from end portions of the first chassis and the second chassis with respect to the second chassis at the 0-degree attitude such that the lock section restricts a rotation of the third chassis by the second hinge, wherein
the first hinge comprises a first hinge shaft serving as a shaft of rotation between the first chassis and the second chassis,
the second hinge comprises a second hinge shaft serving as a shaft of rotation between the first chassis and the third chassis, and
an axial center of the second hinge shaft is disposed on a front side in a front-rear direction of the first chassis and on a bottom side in a top-bottom direction of the first chassis with respect to an axial center of the first hinge shaft.

3. The electronic apparatus according to claim 1, wherein the second hinge does not comprise a torque mechanism section for generating torque for a rotation between the first chassis and the third chassis.

4. The electronic apparatus according to claim 2, wherein the second hinge does not comprise a torque mechanism section for generating torque for a rotation between the first chassis and the third chassis.

* * * * *